(12) United States Patent
Fong

(10) Patent No.: US 11,125,383 B1
(45) Date of Patent: Sep. 21, 2021

(54) ADJUSTABLE SUPPORT DEVICE FOR BAY WINDOWS AND OTHER PROTRUDING BUILDING STRUCTURES

(71) Applicant: Mark Fong, Kearney, NE (US)

(72) Inventor: Mark Fong, Kearney, NE (US)

( * ) Notice: Subject to any disclaimer, the term of this patent is extended or adjusted under 35 U.S.C. 154(b) by 0 days.

(21) Appl. No.: 17/001,898

(22) Filed: Aug. 25, 2020

Related U.S. Application Data

(63) Continuation-in-part of application No. 16/674,254, filed on Nov. 5, 2019, now Pat. No. 10,760,323.

(51) Int. Cl.
*E04G 3/18* (2006.01)
*E06B 1/36* (2006.01)
*F16M 13/02* (2006.01)

(52) U.S. Cl.
CPC .............. *F16M 13/022* (2013.01); *E04G 3/18* (2013.01); *E06B 1/363* (2013.01)

(58) Field of Classification Search
CPC .. E06B 1/363; E06B 7/28; F24F 13/32; E04G 3/18; E04G 13/068; F16M 13/022
See application file for complete search history.

(56) References Cited

U.S. PATENT DOCUMENTS

| | | | | |
|---|---|---|---|---|
| 1,949,820 A ‡ | 3/1934 | Timmons | .................. | A47L 3/02 |
| | | | | 182/59 |
| 2,219,642 A ‡ | 10/1940 | Whiteman | ................ | E04G 3/18 |
| | | | | 182/60 |
| 2,717,139 A * | 9/1955 | Jewell | ..................... | F24F 13/32 |
| | | | | 248/208 |
| 2,834,441 A ‡ | 5/1958 | Mims | ..................... | E06B 1/363 |
| | | | | 52/73 |
| 2,935,284 A ‡ | 5/1960 | Reeves | ................... | F24F 13/32 |
| | | | | 248/208 |
| 5,636,816 A * | 6/1997 | Burton | .................... | F24F 13/32 |
| | | | | 248/208 |
| 5,921,191 A * | 7/1999 | Gabel | ..................... | E05G 7/005 |
| | | | | 109/7 |
| 8,167,260 B2 * | 5/2012 | Boccia | .................... | F24F 13/32 |
| | | | | 248/236 |
| 8,533,955 B2 * | 9/2013 | Agnihotri | .............. | F16M 11/10 |
| | | | | 29/897.3 |
| 8,584,998 B1 * | 11/2013 | Peterson | ................. | F24F 13/32 |
| | | | | 248/208 |
| 9,163,854 B2 * | 10/2015 | Arbucci | ................... | F24F 13/32 |
| 9,303,895 B1 * | 4/2016 | Grant | ..................... | F24F 1/027 |

(Continued)

*Primary Examiner* — Andrew J Triggs
(74) *Attorney, Agent, or Firm* — Nasr Patent Law LLC; Faisal K. Abou-Nasr

(57) ABSTRACT

An adjustable window support device is disclosed. In embodiments, the adjustable window support device includes: a horizontal segment configured to be placed into contact with a lower surface of a bay window; a vertical segment configured to be placed against a wall and configured to extend downwardly from the lower surface of the bay window along the wall; and an adjustable segment configured to extend diagonally from a bottom end of the vertical segment to the pin at or near a front end of the horizontal segment. The adjustable segment includes a first end that is pivotally coupled to the bottom end of the vertical segment and a second end that is configured to be held in a selected position by a pin that extends laterally through at least two holes at or near the front end of the horizontal segment.

20 Claims, 16 Drawing Sheets

(56) References Cited

U.S. PATENT DOCUMENTS

| | | | |
|---|---|---|---|
| 9,447,916 B2* | 9/2016 | Darby | F16M 13/02 |
| 9,605,870 B2* | 3/2017 | Darby | F16M 13/02 |
| 10,077,918 B2* | 9/2018 | Darby | F16M 13/02 |
| 10,203,130 B2* | 2/2019 | Gardikis, Sr. | F16M 13/02 |
| 10,295,221 B2* | 5/2019 | Zhang | F24F 13/32 |
| 10,544,960 B2* | 1/2020 | Darby | F24F 13/32 |
| 10,760,323 B1* | 9/2020 | Fong | E06B 1/60 |
| 2012/0137499 A1* | 6/2012 | Agnihotri | F16M 13/02 |
| | | | 29/462 |
| 2013/0153744 A1* | 6/2013 | Jin | F24F 13/32 |
| | | | 248/670 |
| 2015/0097096 A1* | 4/2015 | Arbucci | E06B 7/28 |
| | | | 248/208 |
| 2018/0023842 A1* | 1/2018 | Gardikis, Sr. | F24F 13/32 |
| | | | 248/674 |

\* cited by examiner
‡ imported from a related application

ADJUSTABLE SUPPORT DEVICE FOR BAY WINDOWS AND OTHER PROTRUDING BUILDING STRUCTURES

CROSS-REFERENCE TO RELATED APPLICATIONS

The present application is a continuation-in-part of U.S. application Ser. No. 16/674,254 (U.S. Pat. No. 10,760,323), filed Nov. 5, 2019, and titled "ADJUSTABLE SUPPORT DEVICE FOR BAY WINDOWS AND OTHER PROTRUDING BUILDING STRUCTURES," which is incorporated herein by reference in its entirety.

TECHNICAL FIELD

The present invention generally relates to structural support devices for portions of commercial and residential buildings, and, more particularly, to structural support devices for bay windows or other protruding portions of commercial and residential buildings.

BACKGROUND

Some portions of a commercial or residential building are designed to protrude from the main building structure. For example, many homes are built with bay windows or may have bay windows installed during remodeling projects. Due to their protruding nature and heavy weight, bay windows have a tendency to sag over time. Wooden brackets or other support structures may be placed beneath the bay windows to help prevent sagging, but this requires customization and only provides a temporary solution because the support structures themselves may settle over time.

There is a need for support devices that are more versatile and capable of providing a long-term solution to the problem of sagging bay windows.

SUMMARY

An adjustable window support device is disclosed. In embodiments, the adjustable window support device includes a horizontal segment, a vertical segment, and an adjustable segment that form a triangular support structure. The horizontal segment is configured to be placed into contact with a lower surface of a bay window so that a front end of the horizontal segment is oriented in the same direction as a front of the bay window and a rear end of the horizontal segment is oriented in the same direction as a rear of the bay window. In embodiments, the horizontal segment includes a plurality of holes at or near a front end of the horizontal segment. The holes are configured to receive a pin that extends through at least two of the holes, such that the pin extends laterally across the horizontal segment. The vertical segment is configured to be placed against a wall and is configured to extend downwardly from the lower surface of the bay window along the wall. In embodiments, the vertical segment includes a top end that is pivotally coupled to the rear end of the horizontal segment. The adjustable segment is configured to extend diagonally from a bottom end of the vertical segment to the pin at or near the front end of the horizontal segment. In embodiments, the adjustable segment includes a first end that is pivotally coupled to the bottom end of the vertical segment and a second end that is configured to be held in a selected position by the pin at or near the front end of the horizontal segment.

The overall dimensions of the adjustable window support device can be modified by adjusting the length of the adjustable segment and/or repositioning the pin from one set of holes at or near the front end of the horizontal segment to another set of holes at or near the front end of the horizontal segment. In this manner, the adjustable window support device can accommodate bay windows installed at various heights and can be adjusted over time to compensate for settling of the bay window and/or the adjustable window support device itself.

In some embodiments, a bay window system includes a bay window with at least two adjustable window support devices placed against a wall beneath the bay window and spaced apart from one another. The adjustable window support devices may be spaced apart so that the weight of the bay window is distributed across both of the adjustable window support devices. In other embodiments, one adjustable window support device may suffice.

Although several embodiments of adjustable window support devices for bay windows are described herein, more generally, an adjustable support device for protruding building structures is disclosed. In embodiments, the adjustable support device includes a horizontal segment, a vertical segment, and an adjustable segment that form a triangular support structure. The horizontal segment is configured to be placed into contact with a lower surface of a protruding building structure so that a front end of the horizontal segment is oriented in the same direction as a front of the protruding building structure and a rear end of the horizontal segment is oriented in the same direction as a rear of the protruding building structure. In embodiments, the horizontal segment includes a plurality of holes at or near a front end of the horizontal segment. The holes are configured to receive a pin that extends through at least two of the holes, such that the pin extends laterally across the horizontal segment. The vertical segment is configured to be placed against a wall and is configured to extend downwardly from the lower surface of the bay window along the wall. In embodiments, the vertical segment includes a top end that is pivotally coupled to the rear end of the horizontal segment. The adjustable segment is configured to extend diagonally from a bottom end of the vertical segment to the pin at or near the front end of the horizontal segment. In embodiments, the adjustable segment includes a first end that is pivotally coupled to the bottom end of the vertical segment and a second end that is configured to be held in a selected position by the pin at or near the front end of the horizontal segment. The overall dimensions of the adjustable support device can be modified by adjusting the length of the adjustable segment and/or repositioning the pin from one set of holes at or near the front end of the horizontal segment to another set of holes at or near the front end of the horizontal segment.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings. Referring generally to FIGS. 1A through 14, an adjustable window support device is disclosed.

As noted above, due to their protruding nature and heavy weight, bay windows have a tendency to sag over time. Wooden brackets or other support structures may be placed beneath the bay windows to help prevent sagging, but this requires customization and only provides a temporary solution because the support structures themselves may settle over time. To overcome the limitations of existing solutions, there is a need for support devices that are more versatile and capable of providing a long-term solution to the problem of sagging bay windows.

The adjustable window support device described herein may overcome some or all of the limitations of the existing solutions discussed above. For example, the adjustable window support device can accommodate bay windows of different sizes, installed at various heights, and can be adjusted over time to compensate for any settling of the adjustable window support device itself.

For context and clarity, an adjustable window support device is described with regard to the installation of bay windows. However, the adjustable window support device may be utilized for other applications, such as the support of other protruding building structures. Thus, in some embodiments, the "adjustable window support device" is more generally an "adjustable support device" configured to support any protruding building structure (e.g., a bay window, an addition, a platform/ledge, a walkway, a deck, or the like).

Figure 1A:
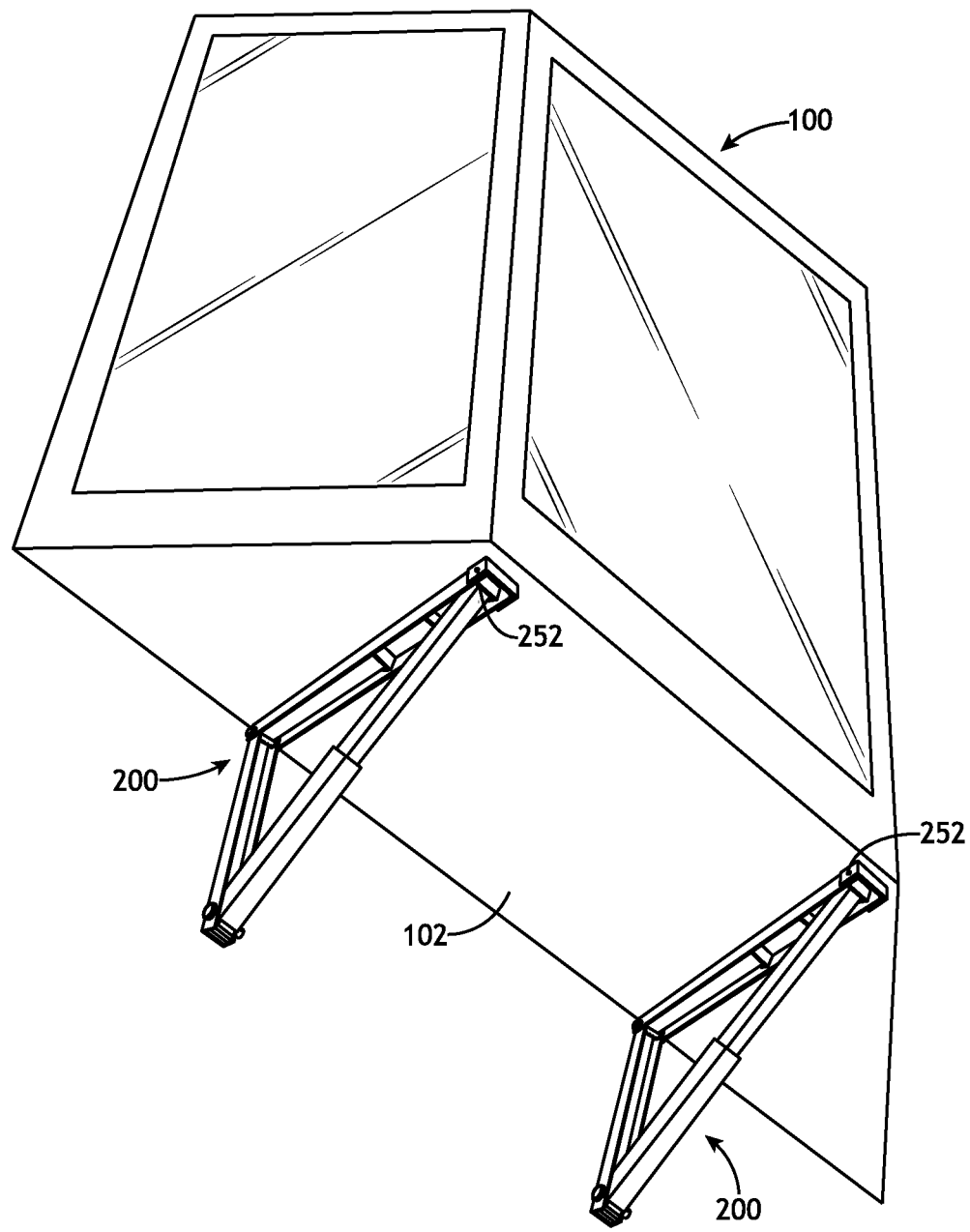
FIG. 1A illustrates perspective view of a bay window supported by two adjustable window support devices, in accordance one or more embodiments of the present disclosure.
Figure 1B:
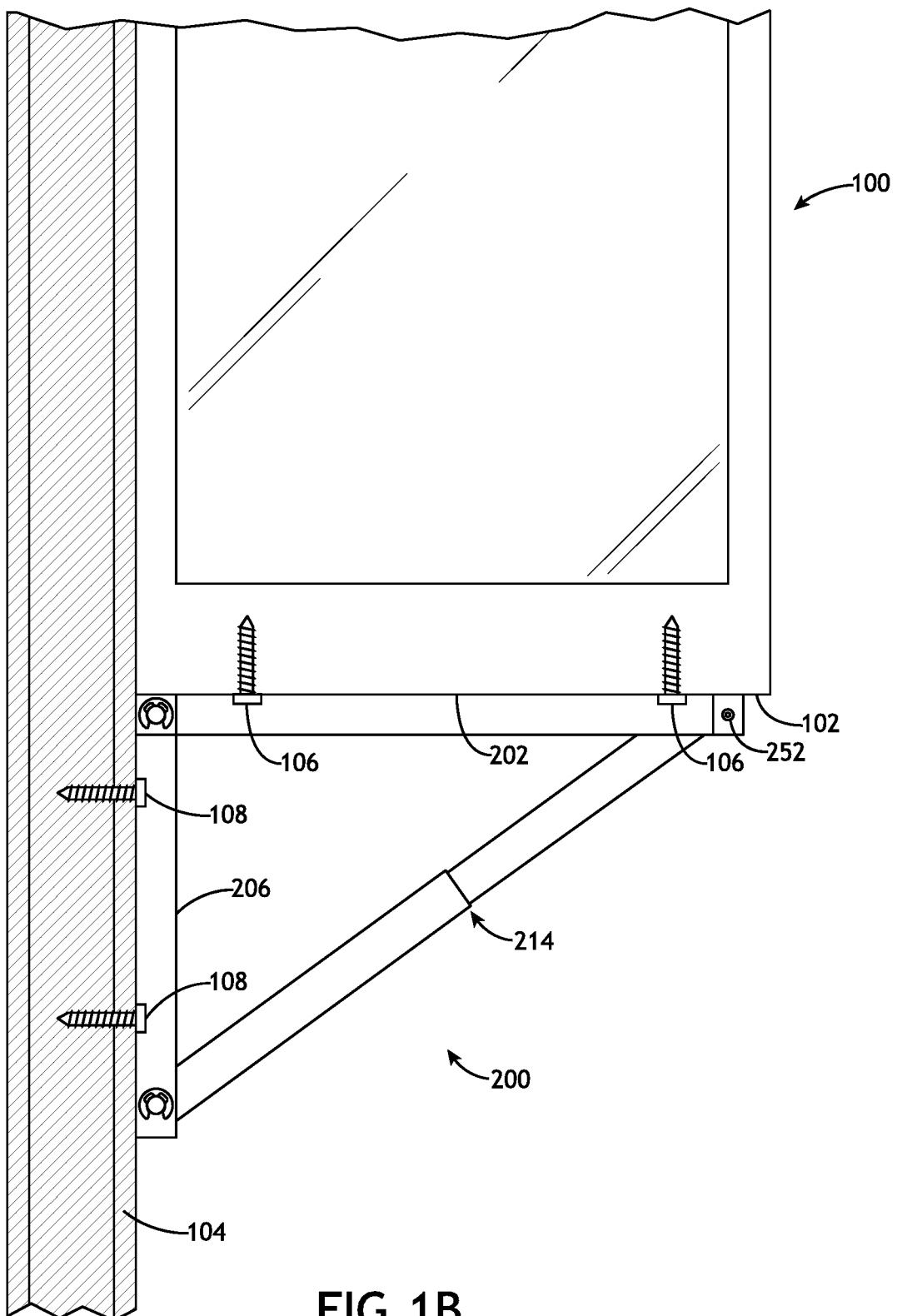
FIG. 1B illustrates a side view of a bay window supported by at least one adjustable window support devices, in accordance one or more embodiments of the present disclosure.

FIGS. 1A through 7 illustrate an adjustable window support device 200, in accordance with one or more embodiments of this disclosure. As shown in FIGS. 1A and 1B, the adjustable window support device 200 may be positioned below a bay window 100 (or any other protruding building structure) to provide support for the bay window 100 so that it does not sag. For example, in the bay window system illustrated in FIG. 1A, two adjustable window support devices 200 are disposed below the bay window 100 and spaced apart so that the weight of the bay window 100 is distributed across both of the adjustable window support devices 200. It may be advantageous to install two or more adjustable window support device 200 below the bay window 100 in order to prevent/mitigate bowing of the lower surface 102 of the bay window 100. However, in other embodiments, one adjustable window support device 200 may suffice. As shown in FIG. 1B, each adjustable window support device 200 is placed against a wall 104 beneath the bay window 100 so that the adjustable window support device 200 is wedged in between the lower surface 102 of the bay window 100 and the wall 104 to prevent the bay window 100 from sagging.

Figure 2:
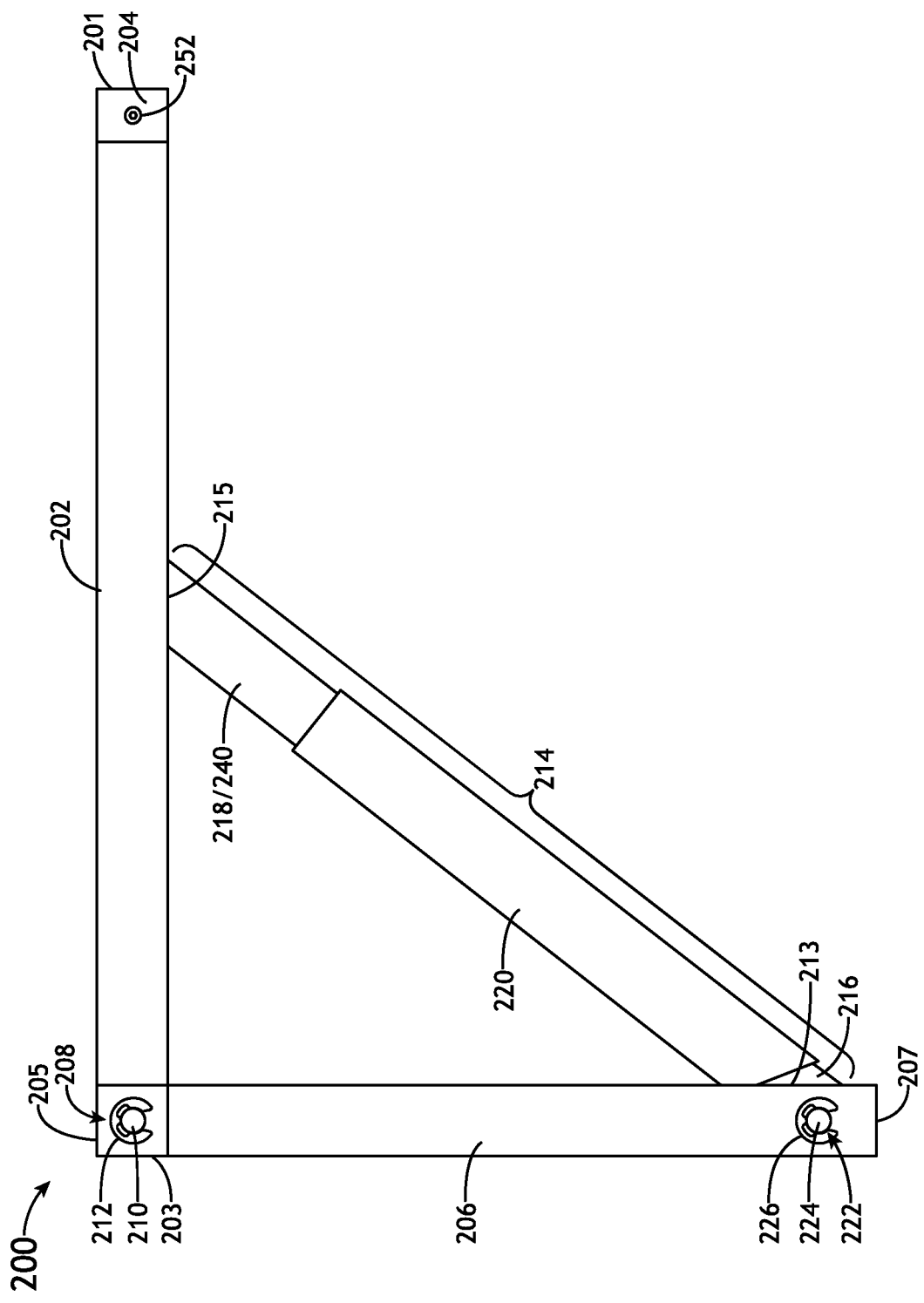
FIG. 2 illustrates a side view of an adjustable window support device, in accordance with one or more embodiments of the present disclosure.

FIGS. 2 through 7 illustrate the adjustable window support device 200 in further detail. As shown in FIG. 2, the adjustable window support device includes a horizontal segment 202, a vertical segment 206, and an adjustable segment 214 that form a triangular support structure. The overall dimensions of the adjustable window support device 200 (i.e., the triangular support structure) can be modified by adjusting the length and/or positioning of the adjustable segment 214, as further discussed below. In this manner, the adjustable window support device 200 can accommodate bay windows 100 of different sizes and can be installed at various heights. The adjustable window support device 200 can also be adjusted over time to compensate for any settling of the adjustable window support device 200 itself.

The segments 202, 206, and 214 may be formed from a metal (e.g., aluminum or titanium) or a metal alloy (e.g., steel, aluminum alloy, titanium alloy, etc.). For example, the segments 202, 206, and 214 may include aluminum/steel box sections, aluminum/steel "U" channels, hollow structural sections, aluminum/steel tubes, or the like. In some embodiments, the horizontal segment 202 and the vertical segment 206 are formed from metallic or non-metallic channels (e.g., aluminum/steel "U" channels, or the like), and the adjustable segment is formed from a plurality of metallic or non-metallic tubes (e.g., aluminum/steel tubes, or the like). Additionally, or alternatively, the segments 202, 206, and 214 may include wood and/or composite materials (e.g., reinforced plastic, fiberglass, etc.). In general, the segments 202, 206, and 214 may be formed from any material or combination of materials that provide adequate support for a bay window 100. In some embodiments, the segments 202, 206, and 214 are water/moisture resistant materials, fire resistant materials, and/or anticorrosive materials for improved durability and/or safety.

The horizontal segment 202 is configured to be placed into contact with a lower surface 102 of a bay window 100 so that a front end 201 of the horizontal segment is oriented in the same direction as a front of the bay window 100 and a rear end 203 of the horizontal segment 202 is oriented in the same direction as a rear of the bay window 100. Meanwhile, the vertical segment 206 is configured to be placed against the wall 104 below the bay window 100 and is configured to extend downwardly from the lower surface 102 of the bay window 100 along the wall 104.

Either of the segments 202 and 206 may be secured in place by fasteners 106 and 108 (e.g., screws, bolts, etc.), respectively. For example, in some embodiments, the horizontal segment 202 is secured to the lower surface 102 of the bay window 100 by at least one fastener 106, and the vertical segment 206 is secured to the wall 104 by at least one other fastener 108. In other embodiments, the horizontal segment 202 is secured to the lower surface 102 of the bay window 100 by at least one fastener 106, while the vertical segment 206 is simply wedged against the wall 104. Alternatively, the vertical segment 206 may be secured to the wall 104 by at least one other fastener 108, while the horizontal segment 202 is wedged against the lower surface 102.

In embodiments, a top end 205 of the vertical segment 206 is pivotally coupled to the rear end 203 of the horizontal segment 202. For example, the top end 205 of the vertical segment 206 and the rear end 203 of the horizontal segment 202 may be held together by a pivot 208, which may include a pin 210, bolt, or any other structure configured to pivotally connect the two segments together. In some embodiments, the pin 210 is held in place by a clip 212 (e.g., E-clip, cotter key, or any other type of pin/bolt fastener) configured to prevent the pin 210 from dislodging.

Figure 5:
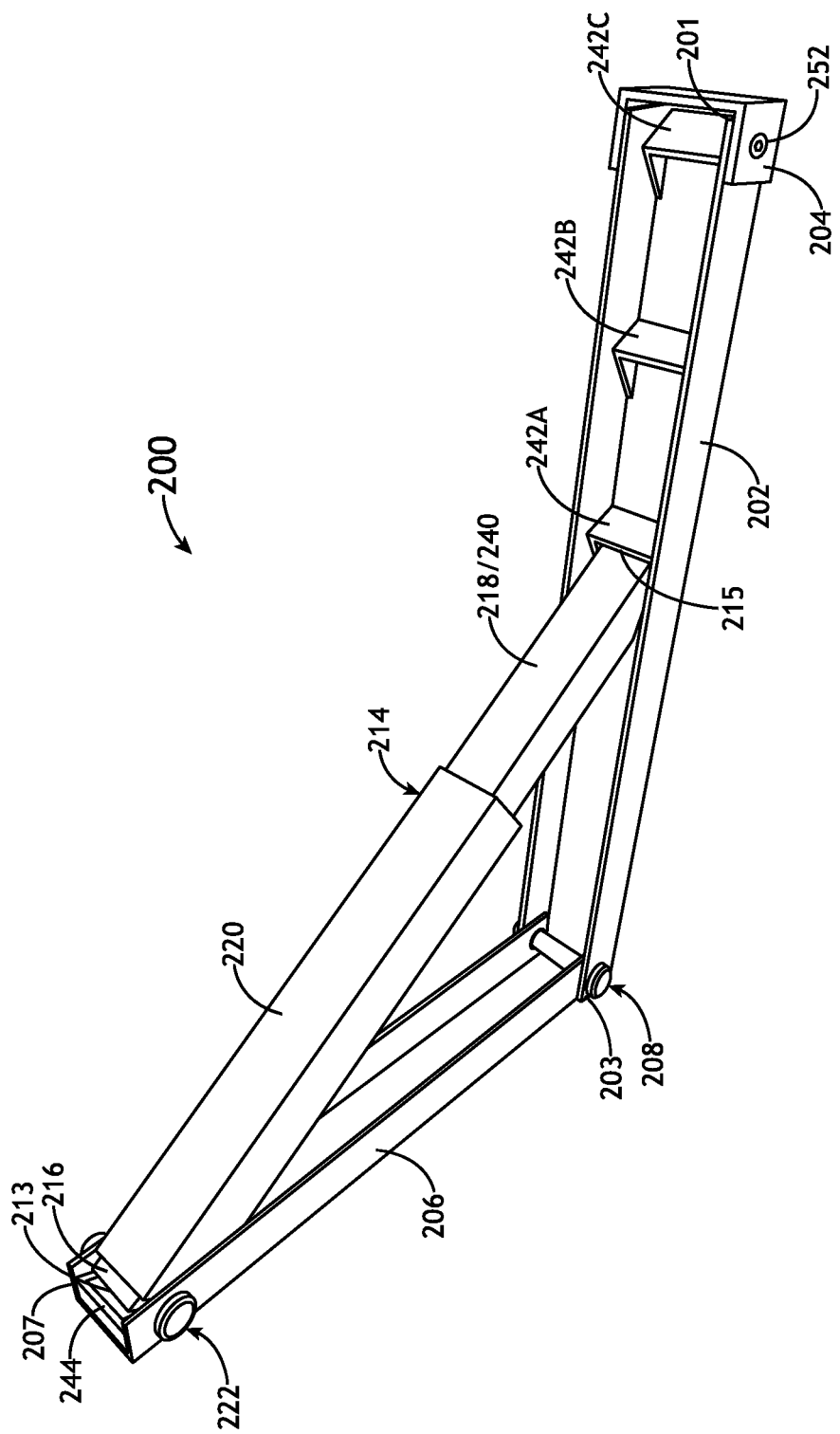
FIG. 5 illustrates a perspective view of an adjustable window support device, in accordance with one or more embodiments of the present disclosure.
Figure 6:
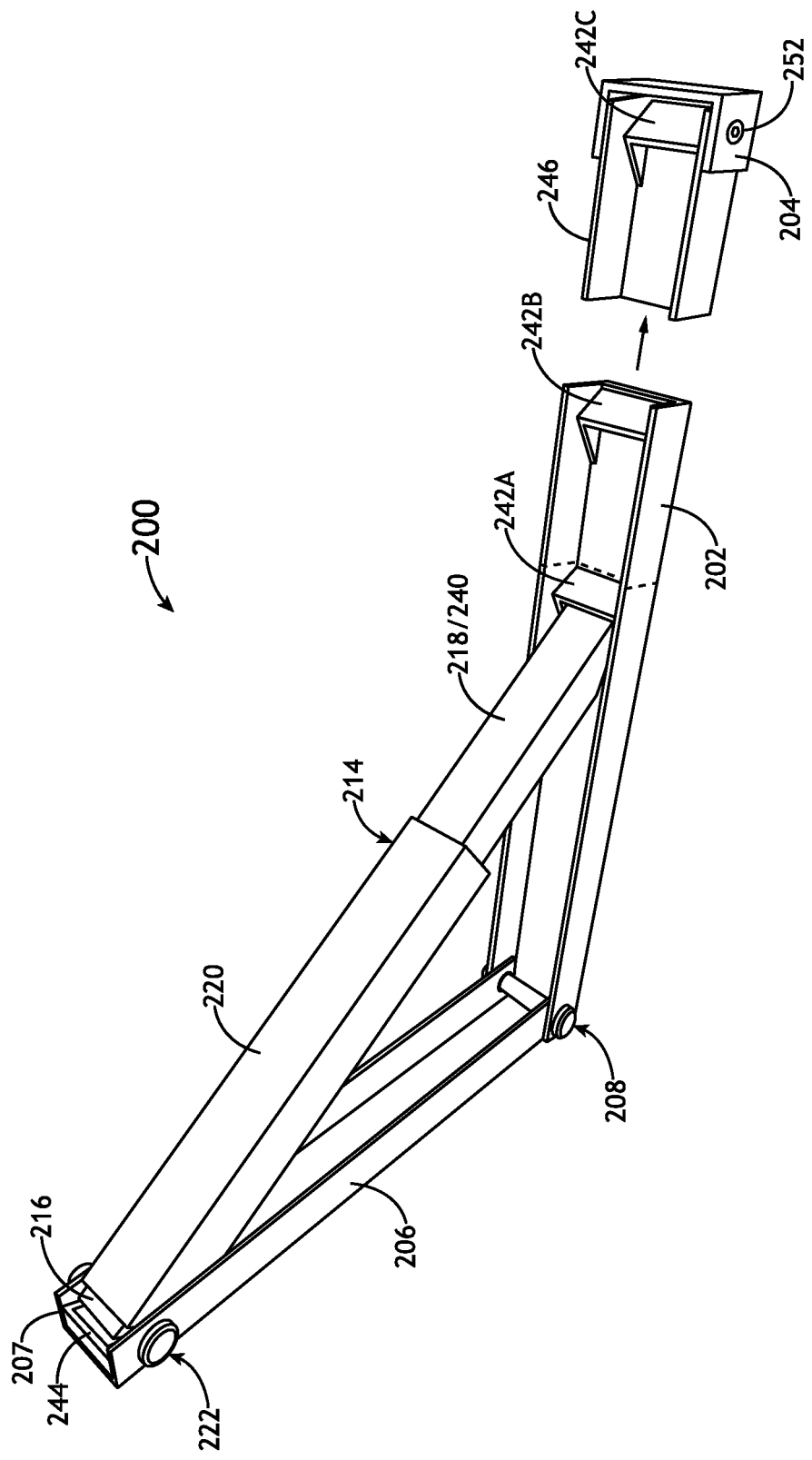
FIG. 6 illustrates a perspective view of an adjustable window support device, where a portion of a horizontal segment of the adjustable window support device is removed to reduce the length of the horizontal segment, in accordance with one or more embodiments of the present disclosure.
Figure 7:
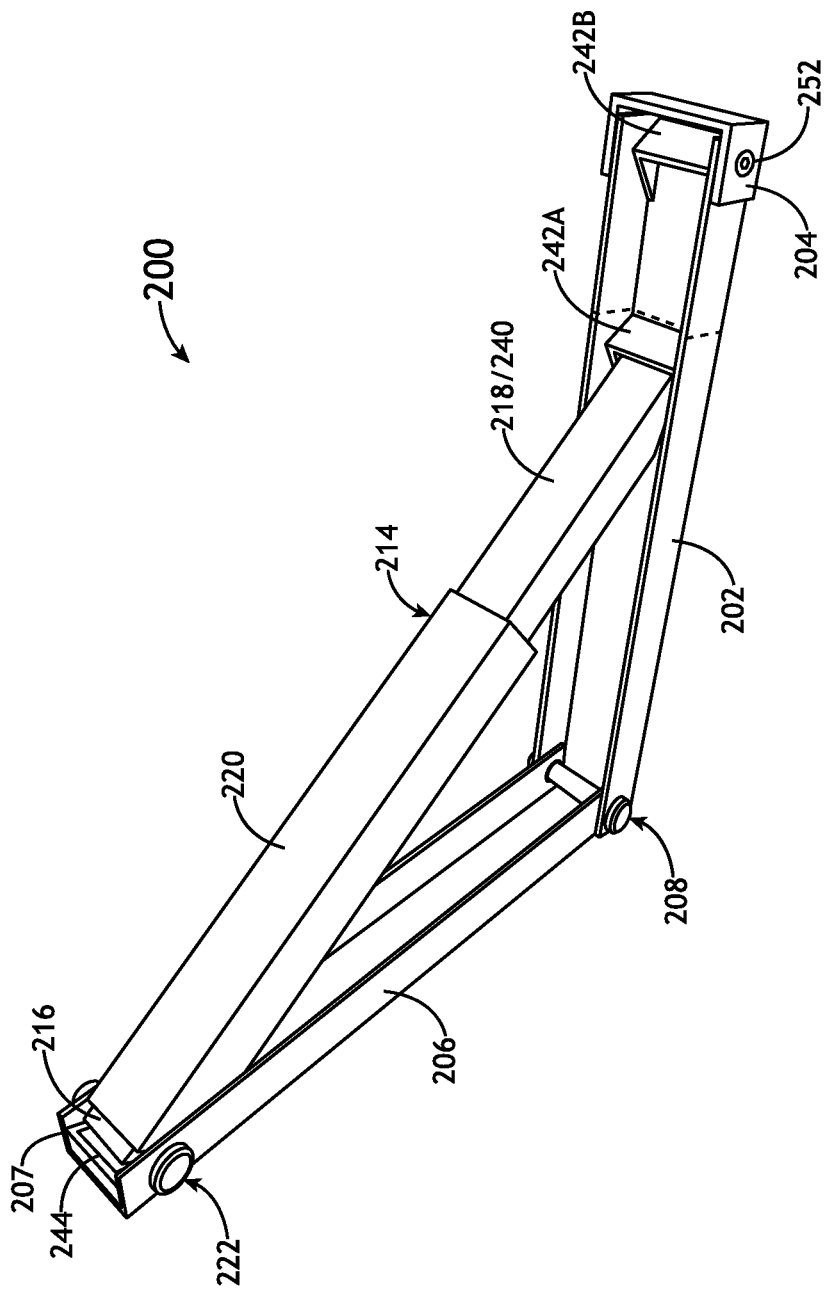
FIG. 7 illustrates a perspective view of the adjustable window support device of FIG. 6, where an end cap of the horizontal segment has been replaced after removing a portion of the horizontal segment to reduce the length of the horizontal segment, in accordance with one or more embodiments of the present disclosure.

As shown in FIGS. 5 through 7, the horizontal segment 202 may include one or more receiving members 242 (e.g., receiving members 242A, 242B, 242C, etc.) at or near the front end 201 of the horizontal segment 202. For example, one or more receiving members 242 may be located between a midpoint of the horizontal segment 202 and the front end 201 of the horizontal segment 202. In embodiments, the receiving members 242 may be protrusions, ridges, slots, pins, bolts, or similar structures formed on a lower/inner surface of the horizontal segment 202 and configured to secure, catch, or otherwise mate with a distal end 215 of the adjustable segment 214 so that the adjustable segment 214 can be repositioned by causing the adjustable segment 214 to mate with a different receiving member 242. In other embodiments, the horizontal segment 202 only includes one receiving member 242; alternatively, an end cap 204 at the front end 201 of the horizontal segment 214 may be configured to function as a receiving member.

In some embodiments, the end cap 204 is removable. As illustrated in FIGS. 6 and 7, this allows for the length of the horizontal segment 202 to be reduced by removing the end cap 204 and cutting off (or otherwise removing) a portion 246 of the horizontal segment 202, and then replacing the end cap 204 on the remaining portion of the horizontal segment 202. In embodiments where the horizontal segment 202 includes a plurality of receiving members 242 (e.g., receiving members 242A, 242B, 242C, etc.), the end cap 204 may be configured to be removed and replaced at the front end 201 of the horizontal segment 202 after removing a portion 246 of the horizontal segment 202 that includes at least one receiving member (e.g., receiving member 242C) of the plurality of receiving members 242 in order to reduce a length of the horizontal segment 202 and leave selected receiving members (e.g., receiving members 242A and 242B). In this manner, unnecessary receiving members (e.g., receiving member 242C) and/or unnecessary portions 246 of the horizontal segment 202 can be removed. This may also allow for the overall dimensions of the adjustable window support device 200 to be adjusted in order to meet the requirements of a particular installation. In embodiments, the end cap 204 may be held in place by one or more set screws 252 (e.g., one set screw, a pair of set screws, etc.) that can be loosened and/or removed in order to remove the end cap 204 and then replaced and/or tightened to firmly hold the end cap 204 in position after the end cap 204 has been replaced at the front end 201 of the horizontal segment 202.

The adjustable segment 214 is configured to extend diagonally from the bottom end 207 of the vertical segment 206 to the one or more receiving members 242 at or near the front end of the horizontal segment 202. In embodiments, the adjustable segment 214 includes a first (proximal) end 213 that is pivotally coupled to the bottom end 207 of the vertical segment 206. For example, the bottom end 207 of the vertical segment 206 and the proximal end 213 of the adjustable segment 214 may be held together by a pivot 222, which may include a pin 224, bolt, or any other structure configured to pivotally connect the two segments together. The pin 224 may be held in place by a clip 226 (e.g., E-clip, cotter key, or any other type of pin/bolt fastener) configured to prevent the pin 224 from dislodging. As shown in FIG. 5, in some embodiments, the pivotal motion (e.g., maximum angular of motion) of the adjustable segment 214 is limited by a raised edge/lip 244 at the bottom end 207 of the vertical segment 206. Additionally, as previously noted, the adjustable segment 214 also includes a second (distal) end 215 that is configured to mate with the one or more receiving members 242 at or near the front end 201 of the horizontal segment 202.

The adjustable segment 214 is configured to be adjusted by increasing or decreasing a length of the adjustable segment 214. In embodiments where the horizontal segment 202 includes a plurality of receiving members 242 (e.g., receiving members 242A, 242B, 242C, etc.), the overall dimensions of the adjustable window support device 200 can also be adjusted by causing the distal end 215 of the adjustable member to mate with a different receiving member (e.g., by moving the distal end 215 from receiving member 242A to 242B, 242A to 242C, 242B to 242A, 242B to 242C, 242C to 242A, 242C to 242B, or the like).

Figure 3:
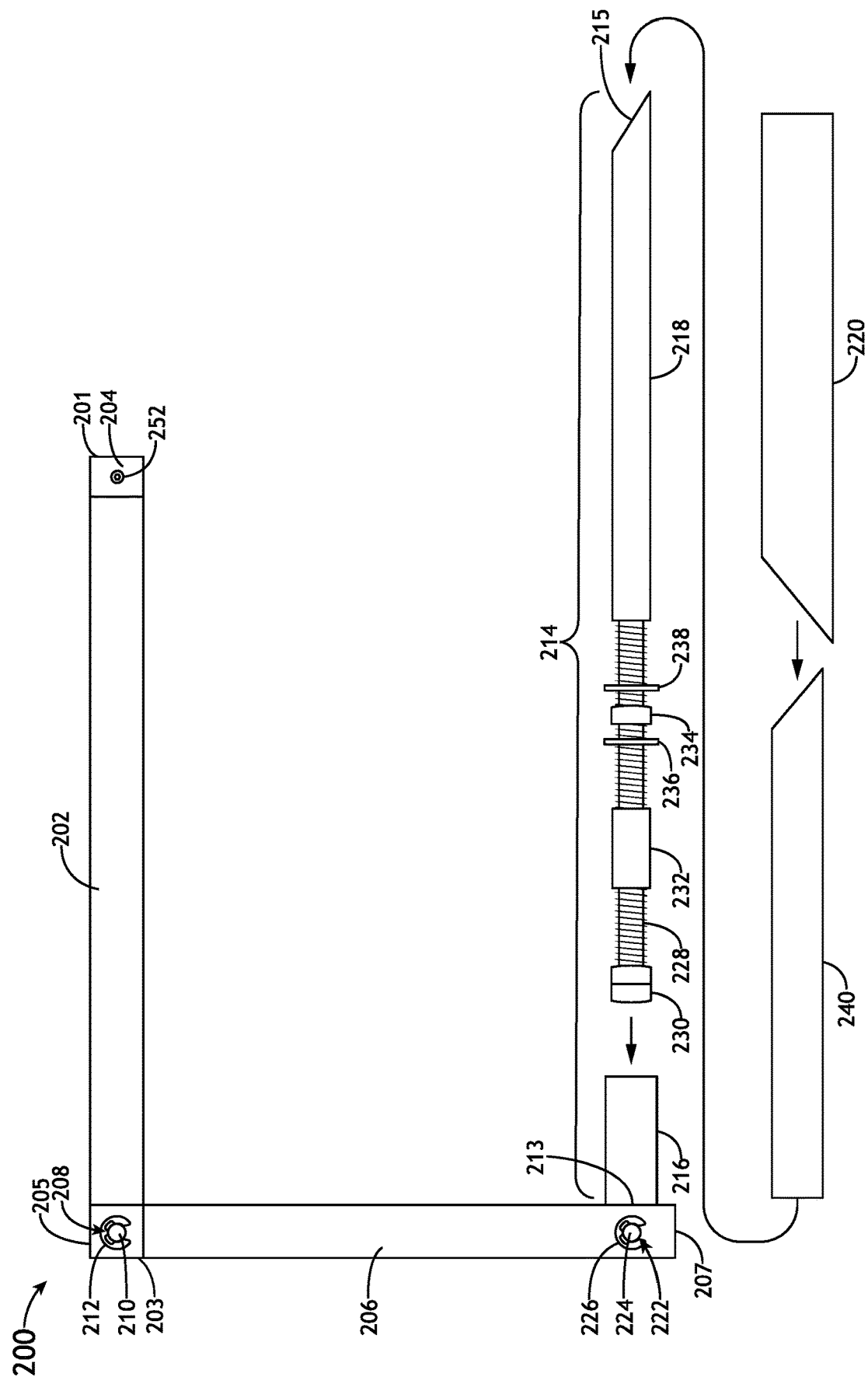
FIG. 3 illustrates a partially exploded side view of an adjustable window support device, in accordance with one or more embodiments of the present disclosure.
Figure 4:
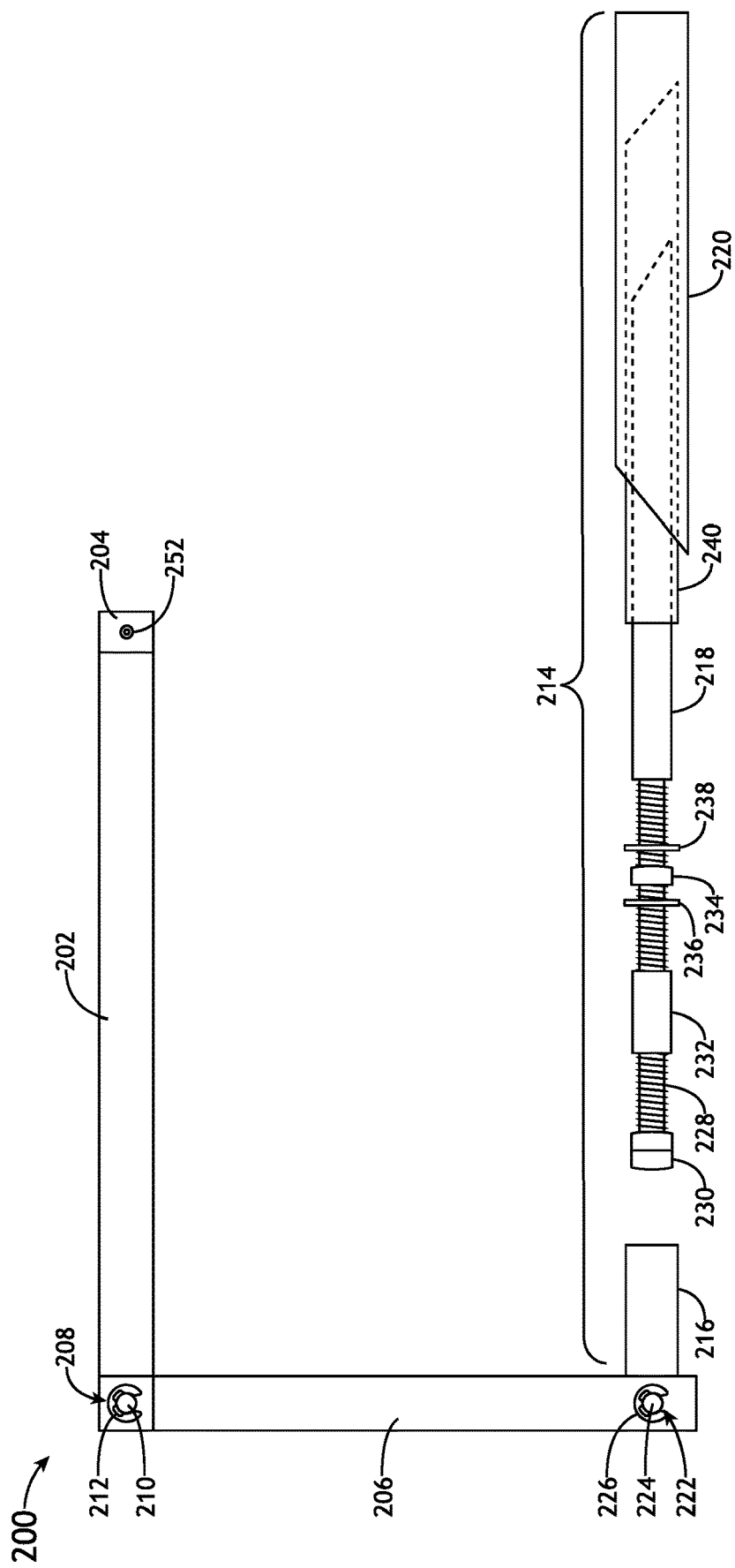
FIG. 4 illustrates a partially exploded side view of an adjustable window support device, in accordance with one or more embodiments of the present disclosure.

FIGS. 3 and 4 show partially exploded views the adjustable segment 214 of the adjustable window support device 200, in accordance with one or more embodiments of the present disclosure.

In embodiments, the adjustable segment 214 includes a base 216 with an inner cavity. For example, the base 216 may be a metallic or non-metallic tube with a rectangular cross-section. In some embodiments, the base may have another geometry (e.g., circular/elliptical cross-section). A proximal end of the base 216 (i.e., the proximal end 213 of the adjustable segment 214) is pivotally coupled to the bottom end 207 of the vertical segment 206, as described above.

The adjustable segment 214 further includes a shaft 228 (e.g., a threaded rod) configured to partially extend into the cavity within the base 216. The shaft 228 may be anchored within the base 216 by one or more end fittings on the shaft 228. For example, the one or more end fittings may include, but are not limited to, one or more nuts 230 (e.g., hex nuts, square nuts, or the like), tubular sections/sleeves/couplings 232, washers, or any combination thereof. In some embodiments, the base 216 has a rectangular cross-section and one or more square/rectangular nuts 230 are used to anchor the shaft 228 in the base 216.

At least one tube 218 is disposed upon the shaft 228 at a distance from the base. In embodiments, tube 218 may be configured to slide along the shaft 228 to any selected position beyond the base 216. Tube 218 may be set/fixed to a selected position by adjusting the position of a nut 234 (e.g., a hex nut, square nut, or the like) configured to support tube 218 at a selected position on the shaft 228. For example, the nut 234 may be positioned along the shaft by turning the nut 234 clockwise or counterclockwise until a selected position is reached. The distance between tube 218 and the base 216 is based upon the position of the nut 234. In other embodiments, the nut 234 may be replaced by another fastener. For example, instead of threading, the shaft 228 may include a plurality of notches and/or teeth configured to mate with ratcheting fasteners.

In some embodiments, the adjustable segment 214 includes at least one washer 238 between the nut 234 and tube 218 on the shaft 228. The washer 238 may have an outer diameter that is greater than an inner diameter of tube 218 so that the washer 238 prevents tube 218 from sliding over the nut 234. The adjustable segment 214 may also include at least one other washer 236 between the nut 234 and the one or more end fittings on the shaft 228. The washer 236 may have an outer diameter that is greater than an inner diameter of the base 216 so that the washer 236 prevents the base 216 from sliding over the nut 234.

The adjustable segment 214 may include another tube 240 configured to slide over at least a portion of tube 218. For example, in some embodiments, tube 218 is a round tube and tube 240 is a rectangular tube that fits over tube 218 for improved strength and/or stability. In other embodiments, tube 218 and tube 240 are both rectangular tubes, both round tubes, or of any other tube geometry or combination of tube geometries. Alternatively, tubes 218 and 240 may be implemented by a single tube or by coaxial tubes that are welded, soldered, or cast together so that they form a common structure.

As shown in FIGS. 5 through 6, another (outermost) tube 220 is configured to slide over and cover at least a portion of tube 218 (and tube 240 if present) and at least a portion of the base 216. Tube 220 may be configured to cover portions of the shaft 228 that are not covered by tube 218 and/or tube 240. Tube 220 may also help stabilize the adjustable segment 214. For example, the outer edges of tube 220 may be configured to fill gaps between the base 216 and the inner walls of the vertical segment 206. In embodiments, the base 216 has a smaller width than the distance between the inner walls of the vertical segment 206 to create gaps for receiving the outer edges of tube 220. When tube 220 slides into the gaps between the base 216 and the inner walls of the vertical segment 206, tube 220 is able to provide improved stability for the base 216 and portions of the adjustable segment 214 that extend from the base 216 by tightly holding these components together, particularly as the weight of the bay window 100 pushes down on the adjustable window support device 200.

In some embodiments, the distal end 215 of tube 218 and/or tube 240 may be slanted in a first direction so that the distal end 215 of tube 218 and/or tube 240 can mate with the receiving members 242. Meanwhile, the distal end of tube 220 may be slanted in a second (opposite) direction so that the distal end of tube 220 can mate with the gaps between the base 216 and the inner walls of the vertical segment 206 when tube 220 is slid over the base 216 and pushed all the way down shaft 228.

Figure 8A:
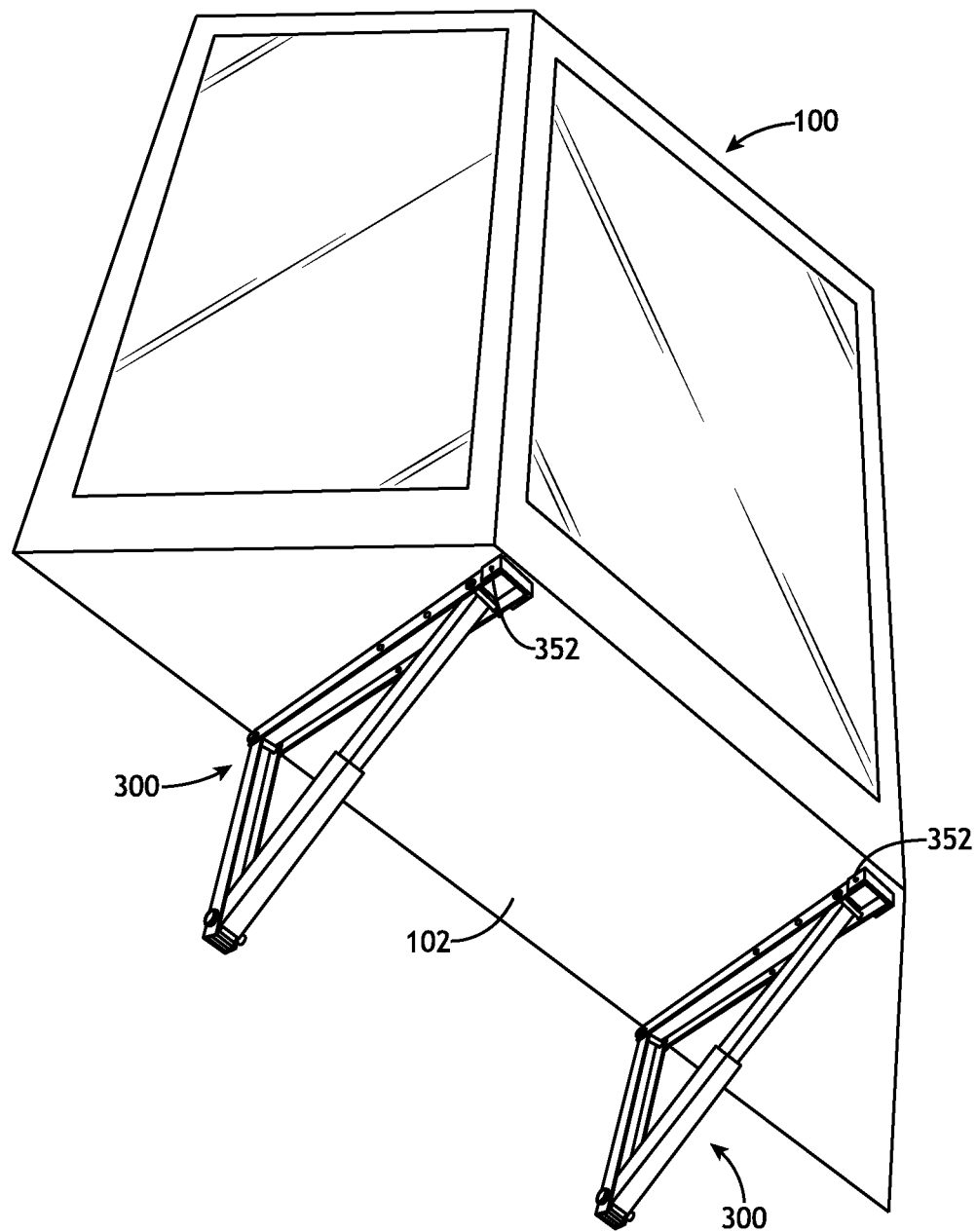
FIG. 8A illustrates perspective view of a bay window supported by two adjustable window support devices, in accordance one or more embodiments of the present disclosure.
Figure 8B:
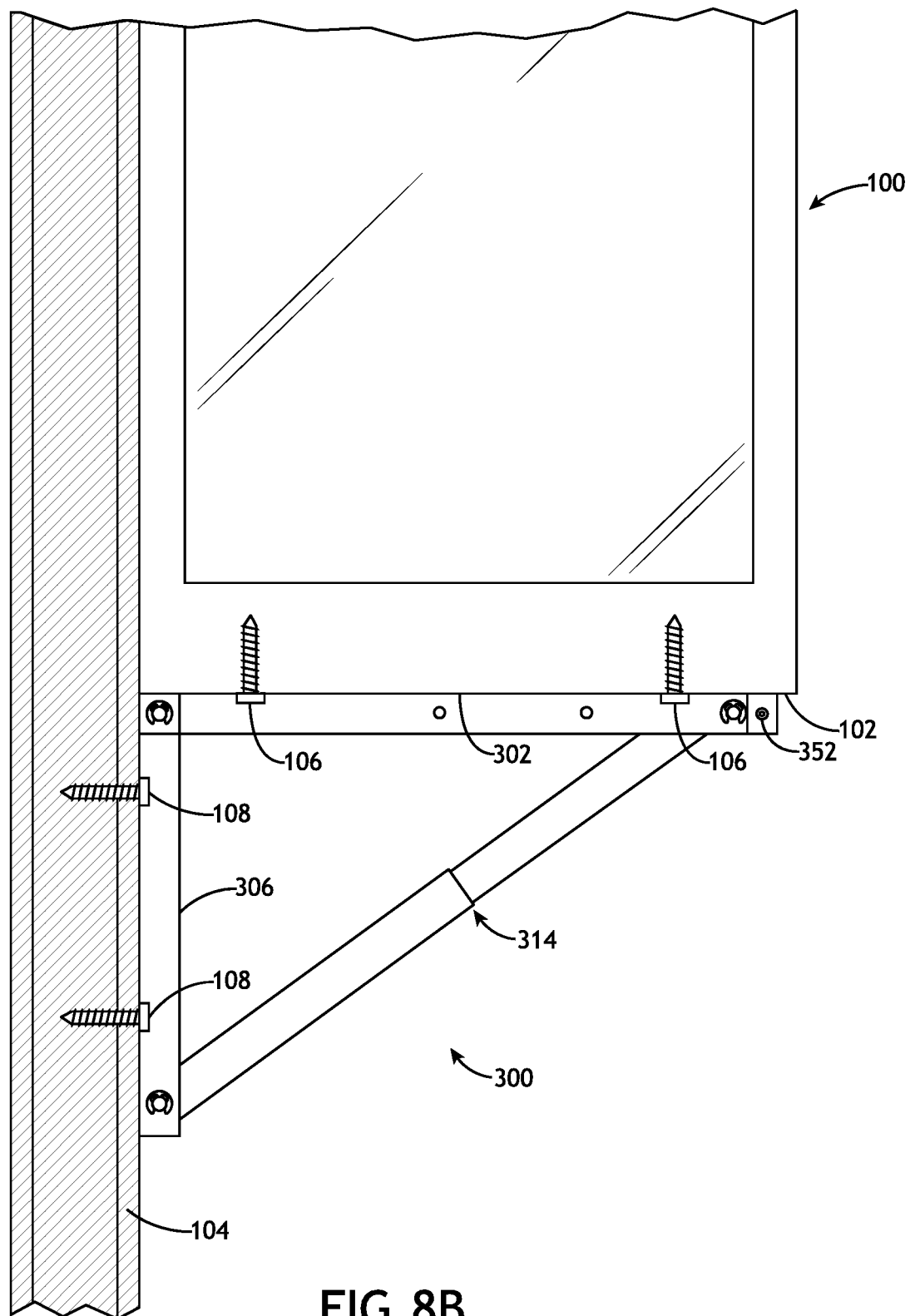
FIG. 8B illustrates a side view of a bay window supported by at least one adjustable window support devices, in accordance one or more embodiments of the present disclosure.

FIGS. 8A through 14 illustrate an adjustable window support device 300, in accordance with one or more additional embodiments of this disclosure. As shown in FIGS. 8A and 8B, the adjustable window support device 300 may be positioned below a bay window 100 (or any other protruding building structure) to provide support for the bay window 100 so that it does not sag. For example, in the bay window system illustrated in FIG. 8A, two adjustable window support devices 300 are disposed below the bay window 100 and spaced apart so that the weight of the bay window 100 is distributed across both of the adjustable window support devices 300. It may be advantageous to install two or more adjustable window support device 300 below the bay window 100 in order to prevent/mitigate bowing of the lower surface 102 of the bay window 100. However, in other embodiments, one adjustable window support device 300 may suffice. As shown in FIG. 8B, each adjustable window support device 300 is placed against a wall 104 beneath the bay window 100 so that the adjustable window support device 300 is wedged in between the lower surface 102 of the bay window 100 and the wall 104 to prevent the bay window 100 from sagging.

Figure 9:
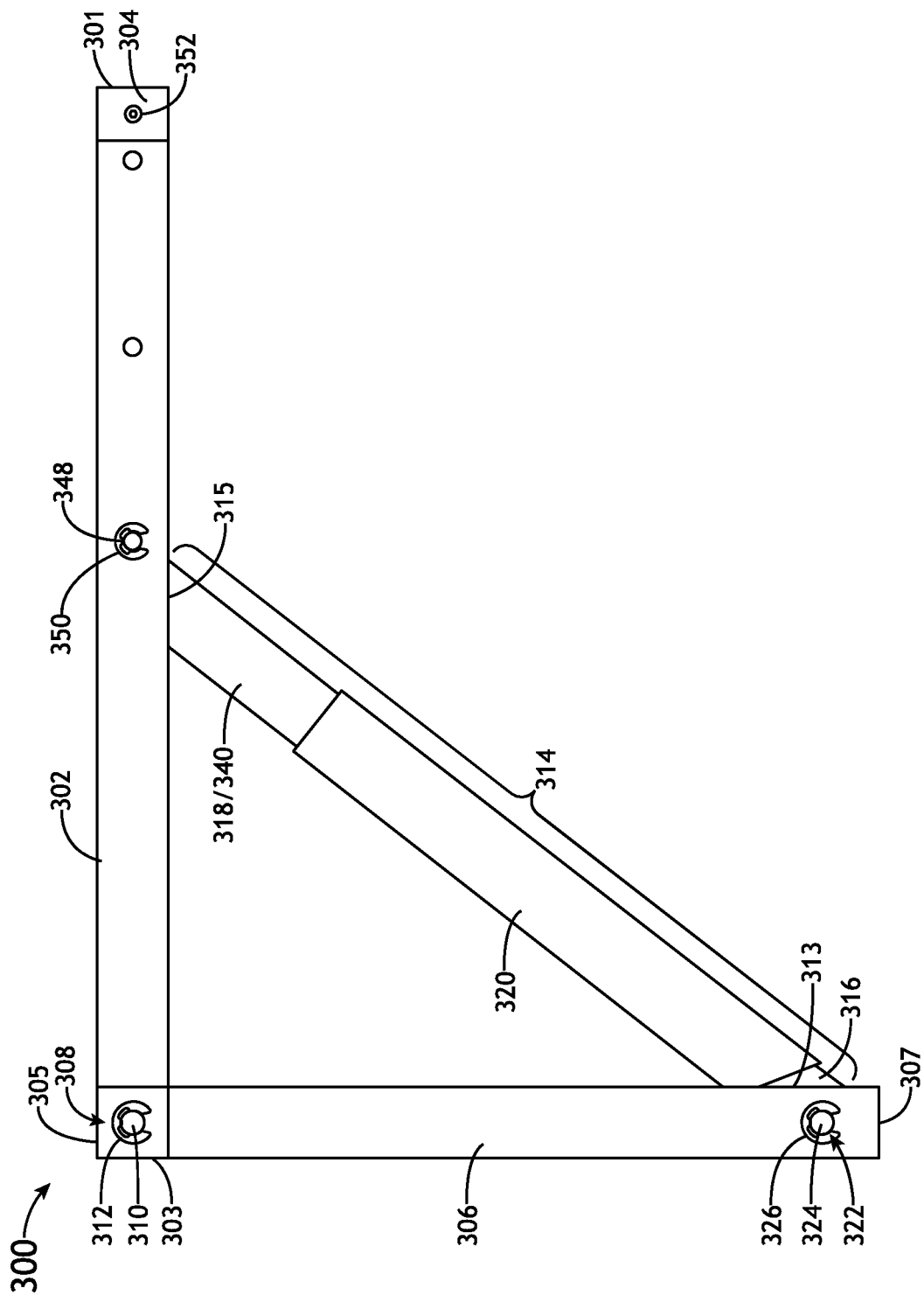
FIG. 9 illustrates a side view of an adjustable window support device, in accordance with one or more embodiments of the present disclosure.

FIGS. 9 through 14 illustrate the adjustable window support device 300 in further detail. As shown in FIG. 9, the adjustable window support device includes a horizontal segment 302, a vertical segment 306, and an adjustable segment 314 that form a triangular support structure. The overall dimensions of the adjustable window support device 300 (i.e., the triangular support structure) can be modified by adjusting the length and/or positioning of the adjustable segment 314, as further discussed below. In this manner, the adjustable window support device 300 can accommodate bay windows 100 of different sizes and can be installed at various heights. The adjustable window support device 300 can also be adjusted over time to compensate for any settling of the adjustable window support device 300 itself.

The segments 302, 306, and 314 may be formed from a metal (e.g., aluminum or titanium) or a metal alloy (e.g., steel, aluminum alloy, titanium alloy, etc.). For example, the segments 302, 306, and 314 may include aluminum/steel box sections, aluminum/steel "U" channels, hollow structural sections, aluminum/steel tubes, or the like. In some embodiments, the horizontal segment 302 and the vertical segment 306 are formed from metallic or non-metallic channels (e.g., aluminum/steel "U" channels, or the like), and the adjustable segment is formed from a plurality of metallic or non-metallic tubes (e.g., aluminum/steel tubes, or the like). Additionally, or alternatively, the segments 302, 306, and 314 may include wood and/or composite materials (e.g., reinforced plastic, fiberglass, etc.). In general, the segments 302, 306, and 314 may be formed from any material or combination of materials that provide adequate support for a bay window 100. In some embodiments, the segments 302, 306, and 314 are water/moisture resistant materials, fire resistant materials, and/or anticorrosive materials for improved durability and/or safety.

The horizontal segment 302 is configured to be placed into contact with a lower surface 102 of a bay window 100 so that a front end 301 of the horizontal segment is oriented in the same direction as a front of the bay window 100 (away from the wall 104) and a rear end 303 of the horizontal segment 302 is oriented in the same direction as a rear of the bay window 100 (toward the wall 104). Meanwhile, the vertical segment 306 is configured to be placed against the wall 104 below the bay window 100 and is configured to extend downwardly from the lower surface 102 of the bay window 100 along the wall 104.

Either of the segments 302 and 306 may be secured in place by fasteners 106 and 108 (e.g., screws, bolts, etc.), respectively. For example, in some embodiments, the horizontal segment 302 is secured to the lower surface 102 of the bay window 100 by at least one fastener 106, and the vertical segment 306 is secured to the wall 104 by at least one other fastener 108. In other embodiments, the horizontal segment 302 is secured to the lower surface 102 of the bay window 100 by at least one fastener 106, while the vertical segment 306 is simply wedged against the wall 104. Alternatively, the vertical segment 306 may be secured to the wall 104 by at least one other fastener 108, while the horizontal segment 302 is wedged against the lower surface 102.

In embodiments, a top end 305 of the vertical segment 306 is pivotally coupled to the rear end 303 of the horizontal segment 302. For example, the top end 305 of the vertical segment 306 and the rear end 303 of the horizontal segment 302 may be held together by a pivot 308, which may include a pin 310, bolt, or any other structure configured to pivotally connect the two segments together. In some embodiments, the pin 310 is held in place by a clip 312 (e.g., E-clip, cotter key, or any other type of pin/bolt fastener) configured to prevent the pin 310 from dislodging.

Figure 12:
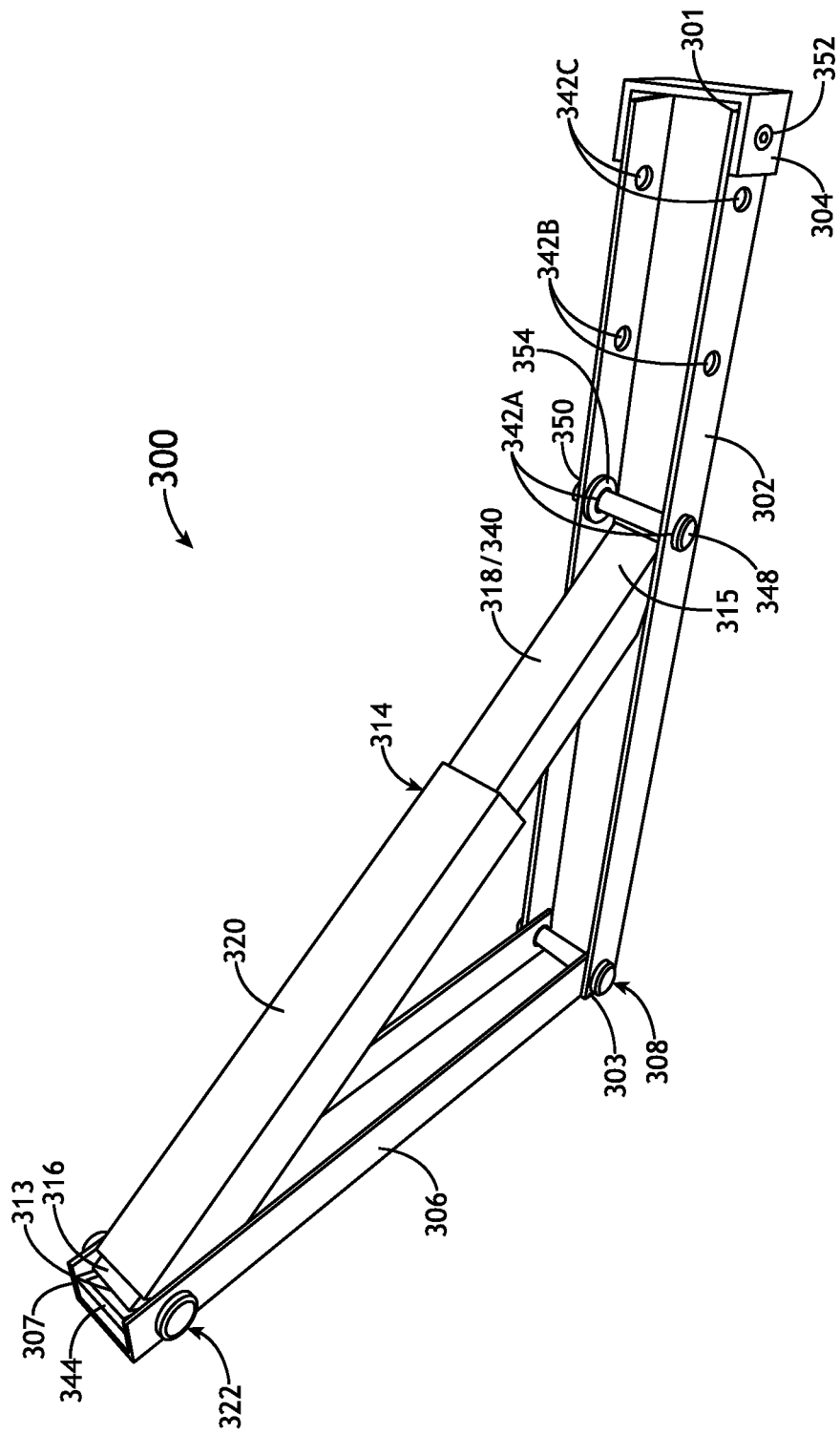
FIG. 12 illustrates a perspective view of an adjustable window support device, in accordance with one or more embodiments of the present disclosure.
Figure 13:
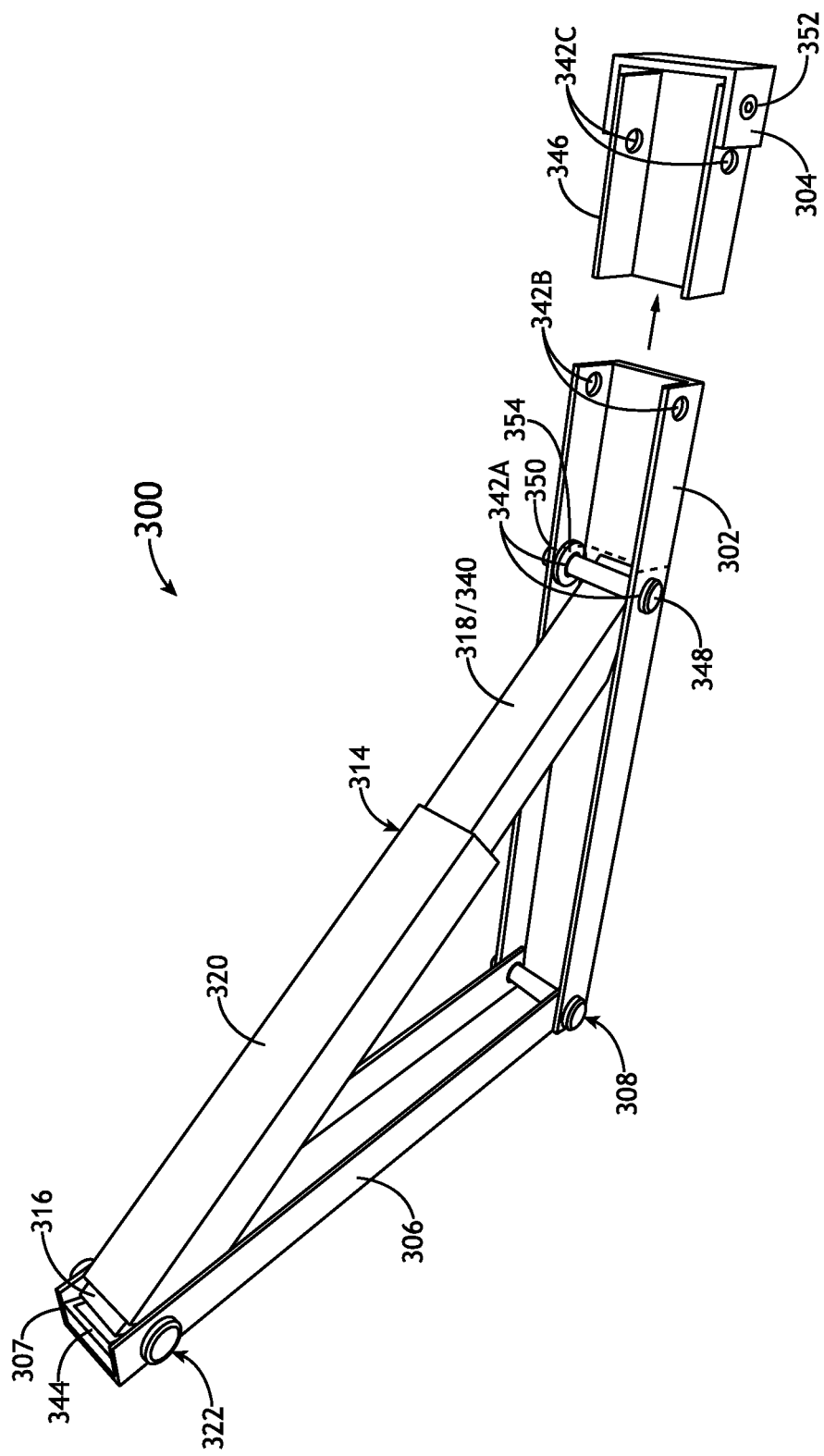
FIG. 13 illustrates a perspective view of an adjustable window support device, where a portion of a horizontal segment of the adjustable window support device is removed to reduce the length of the horizontal segment, in accordance with one or more embodiments of the present disclosure.
Figure 14:
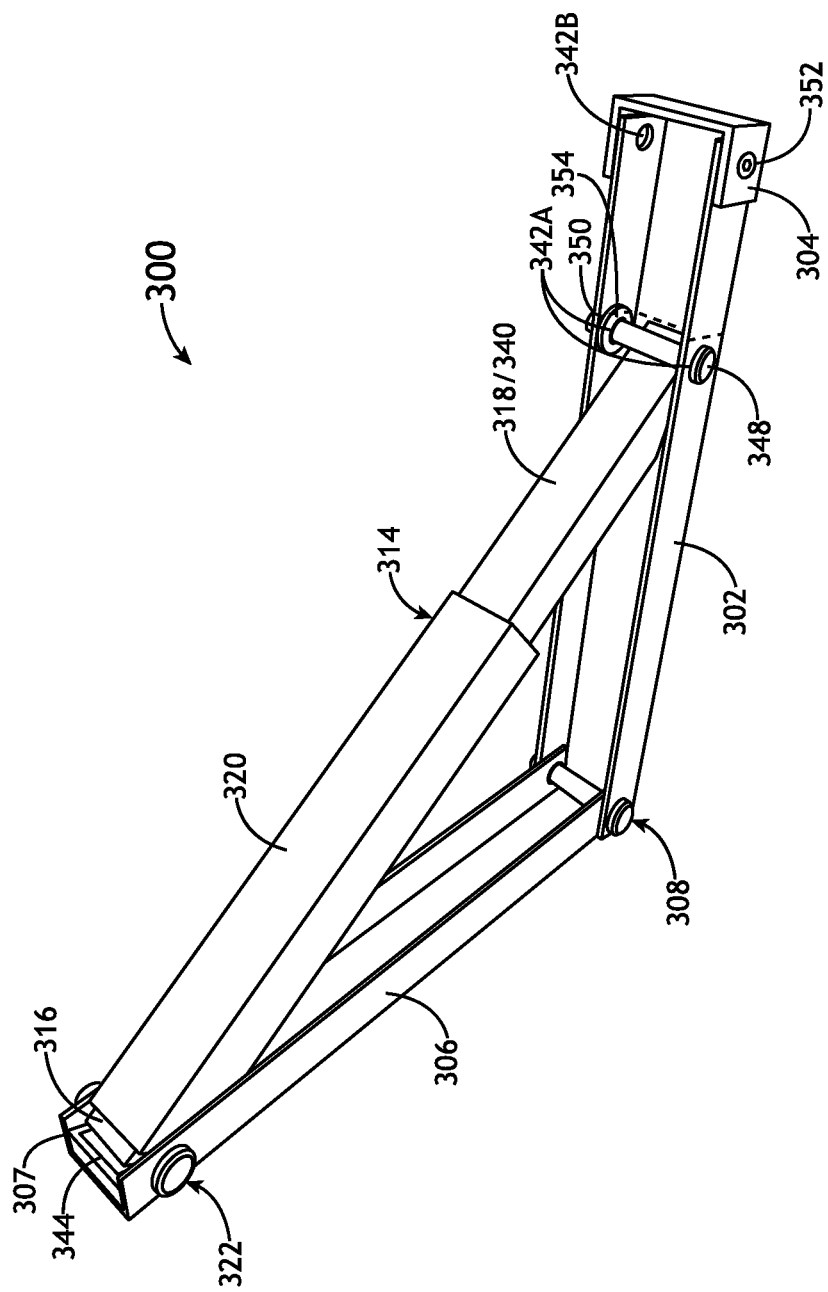
FIG. 14 illustrates a perspective view of the adjustable window support device of FIG. 13, where an end cap of the horizontal segment has been replaced after removing a portion of the horizontal segment to reduce the length of the horizontal segment, in accordance with one or more embodiments of the present disclosure.

As shown in FIGS. 12 through 14, the horizontal segment 302 may include one or more sets of holes 342 (e.g., holes 342A, 342B, 342C, etc.) at or near the front end 301 of the horizontal segment 302. For example, one or more sets of holes 342 may be located between a midpoint of the horizontal segment 302 and the front end 301 of the horizontal segment 302. In embodiments, the holes 342 are formed through the walls/edges of the horizontal segment 302 and configured to receive at least one pin 348 or bolt that extends through at least two of the holes 342, wherein the pin 348 extends laterally across the horizontal segment 302. For example, as shown in FIG. 12, the pin 348 may extend through a set of holes 342B that are aligned with one another, on opposite walls/edges of the horizontal segment 302, such that the pin 348 extends laterally across the horizontal segment 302.

The pin 348 may be configured to secure, catch, or otherwise hold a distal end 315 of the adjustable segment 314 in a selected position. In this regard, the adjustable segment 314 may be repositioned by repositioning the pin 348 from one set of holes (e.g., holes 342B) to another set of holes (e.g., holes 342A, 342C, or any other set of holes). In other embodiments, the adjustable window support device 300 may include a plurality of pins 348 located at different sets of holes 342. In this regard, the adjustable segment 314 may be repositioned by placing the adjustable segment 314 into contact with another pin 348 located at a different set of holes 342. In embodiments, the pin 348 may have one or more washers 354 are disposed upon the pin 348 to assist in filling any gaps between the adjustable segment 314 and the inner walls/edges of the horizontal segment 302. For example, the pin 348 may have at least two washers 354 on the pin 348, on either side of the adjustable segment 314, so that the adjustable segment 314 is firmly held in place after being placed into contact with the pin 348.

In embodiments where the pin 348 is configured to be repositioned from one set of holes (e.g., holes 342B) to another set of holes (e.g., holes 342A, 342C, or any other set of holes), the pin 348 may be secured within a set of holes 342 by a clip 350 (e.g., E-clip, cotter key, or any other type of pin/bolt fastener). To reposition the pin 348, the clip 350 may be removed so that the pin 348 can be withdrawn from one set of holes (e.g., holes 342B) and inserted through to another set of holes (e.g., holes 342A, 342C, or any other set of holes). The clip 350 may then be fastened to a distal end of the pin 348 to secure the pin 348 in its new position.

In some embodiments, the end cap 304 is removable. As illustrated in FIGS. 13 and 14, this allows for the length of the horizontal segment 302 to be reduced by removing the end cap 304 and cutting off (or otherwise removing) a portion 346 of the horizontal segment 302, and then replacing the end cap 304 on the remaining portion of the horizontal segment 302. In embodiments where the horizontal segment 302 includes a plurality of holes 342, the end cap 304 may be configured to be removed and replaced at the front end 301 of the horizontal segment 302 after removing a portion 346 of the horizontal segment 302 that includes two or more holes (e.g., set of holes 342C) of the plurality of holes 342 in order to reduce a length of the horizontal segment 302 and leave selected sets of holes (e.g., sets of holes 342A and 342B). In this manner, unnecessary sets of holes (e.g., set of holes 342C) and/or unnecessary portions 346 of the horizontal segment 302 can be removed. This may also allow for the overall dimensions of the adjustable window support device 300 to be adjusted in order to meet the requirements of a particular installation. In embodiments, the end cap 304 may be held in place by one or more set screws 352 (e.g., one set screw, a pair of set screws, etc.) that can be loosened and/or removed in order to remove the end cap 304 and then replaced and/or tightened to firmly hold the end cap 304 in position after the end cap 304 has been replaced at the front end 301 of the horizontal segment 302.

The use of at least one repositionable pin 348 and holes 342 formed through the walls/edges of the horizontal segment 302 may have certain advantages over the use of welded or permanently attached receiving members. For instance, it may be challenging to remove a portion 346 of the horizontal segment 302 if a cut must be made through a welded or permanently attached receiving member because of increased material thickness at the cut. Conversely, cutting through a set of holes 342 will not provide the same challenges because the holes 342 have no material thickness.

The adjustable segment 314 is configured to extend diagonally from the bottom end 307 of the vertical segment 306 to the pin 348 placed through a selected set of holes (e.g., set of holes 342B) at or near the front end of the horizontal segment 302. In embodiments, the adjustable segment 314 includes a first (proximal) end 313 that is pivotally coupled to the bottom end 307 of the vertical segment 306. For example, the bottom end 307 of the vertical segment 306 and the proximal end 313 of the adjustable segment 314 may be held together by a pivot 322, which may include a pin 324, bolt, or any other structure configured to pivotally connect the two segments together. The pin 324 may be held in place by a clip 326 (e.g., E-clip, cotter key, or any other type of pin/bolt fastener) configured to prevent the pin 324 from dislodging. As shown in FIG. 12, in some embodiments, the pivotal motion (e.g., maximum angular of motion) of the adjustable segment 314 is limited by a raised edge/lip 344 at the bottom end 307 of the vertical segment 306. Additionally, as previously noted, the adjustable segment 314 also includes a second (distal) end 315 that is configured to mate with the pin 348 at or near the front end 301 of the horizontal segment 302.

The adjustable segment 314 is configured to be adjusted by increasing or decreasing a length of the adjustable segment 314. In embodiments where the horizontal segment 302 includes a plurality of holes 342 (e.g., holes 342A, 342B, 342C, etc.), the overall dimensions of the adjustable window support device 300 can also be adjusted by causing the distal end 315 of the adjustable member to mate with the pin 348 after repositioning the pin 348 from one set of holes to another set of holes (e.g., by moving the pin 348 from set of holes 342A to 342B, 342A to 342C, 342B to 342A, 342B to 342C, 342C to 342A, 342C to 342B, or the like).

Figure 10:
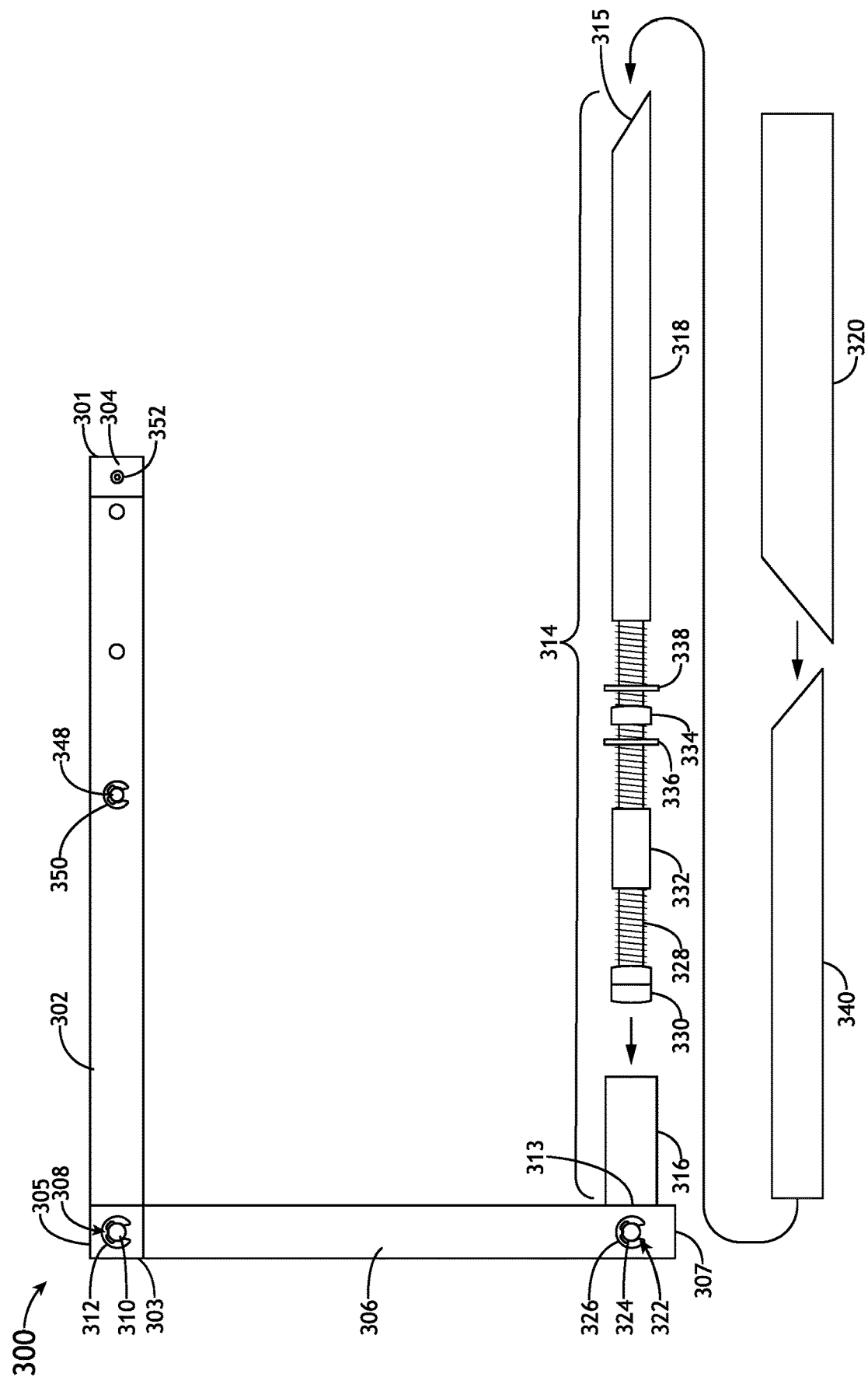
FIG. 10 illustrates a partially exploded side view of an adjustable window support device, in accordance with one or more embodiments of the present disclosure.
Figure 11:
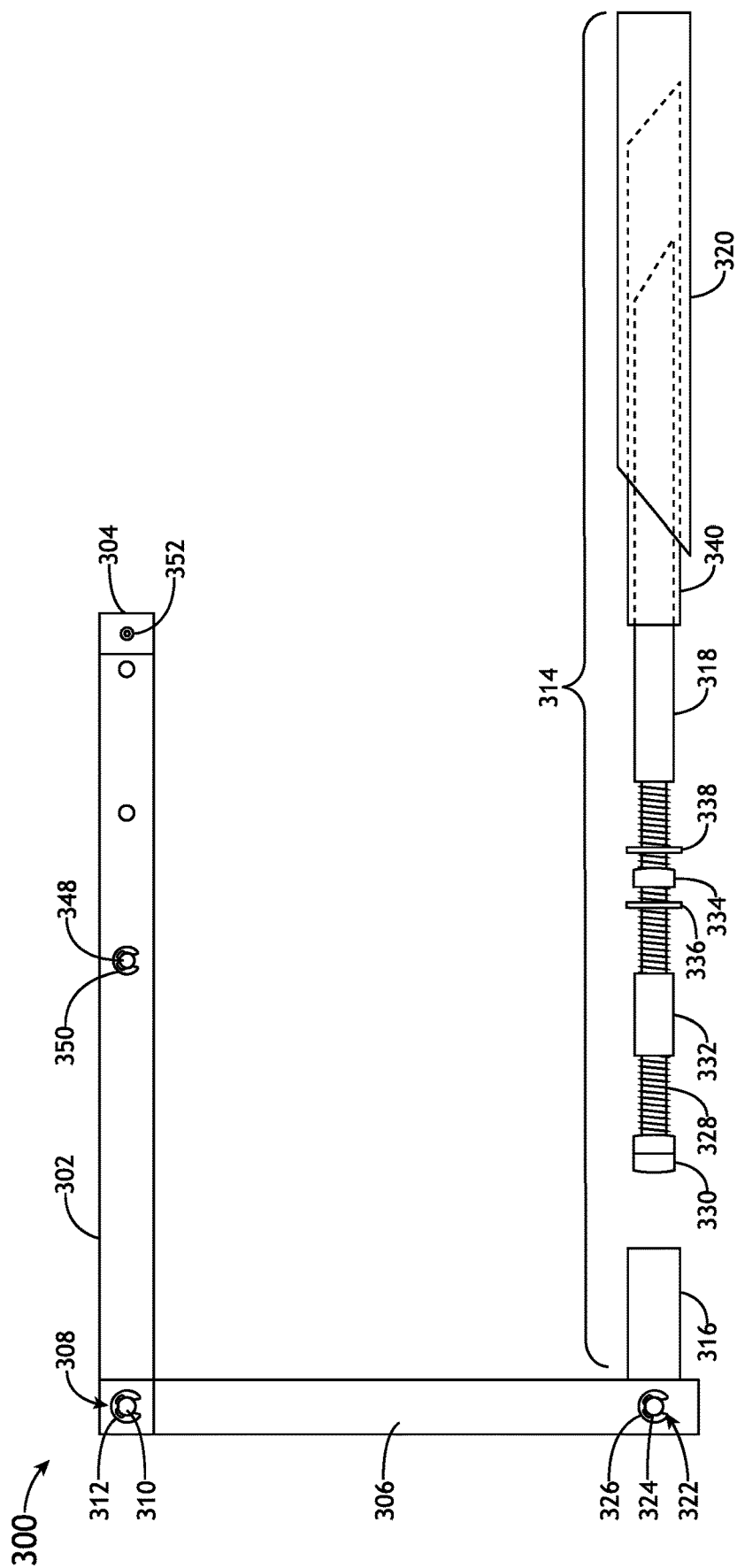
FIG. 11 illustrates a partially exploded side view of an adjustable window support device, in accordance with one or more embodiments of the present disclosure.

FIGS. 10 and 11 show partially exploded views the adjustable segment 314 of the adjustable window support device 300, in accordance with one or more embodiments of the present disclosure.

In embodiments, the adjustable segment 314 includes a base 316 with an inner cavity. For example, the base 316 may be a metallic or non-metallic tube with a rectangular cross-section. In some embodiments, the base may have another geometry (e.g., circular/elliptical cross-section). A proximal end of the base 316 (i.e., the proximal end 313 of the adjustable segment 314) is pivotally coupled to the bottom end 307 of the vertical segment 306, as described above.

The adjustable segment 314 further includes a shaft 328 (e.g., a threaded rod) configured to partially extend into the cavity within the base 316. The shaft 328 may be anchored within the base 316 by one or more end fittings on the shaft 328. For example, the one or more end fittings may include, but are not limited to, one or more nuts 330 (e.g., hex nuts, square nuts, or the like), tubular sections/sleeves/couplings 332, washers, or any combination thereof. In some embodiments, the base 316 has a rectangular cross-section and one or more square/rectangular nuts 330 are used to anchor the shaft 328 in the base 316.

At least one tube 318 is disposed upon the shaft 328 at a distance from the base. In embodiments, tube 318 may be configured to slide along the shaft 328 to any selected position beyond the base 316. Tube 318 may be set/fixed to a selected position by adjusting the position of a nut 334 (e.g., a hex nut, square nut, or the like) configured to support tube 318 at a selected position on the shaft 328. For example, the nut 334 may be positioned along the shaft by turning the nut 334 clockwise or counterclockwise until a selected position is reached. The distance between tube 318 and the base 316 is based upon the position of the nut 334. In other embodiments, the nut 334 may be replaced by another fastener. For example, instead of threading, the shaft 328 may include a plurality of notches and/or teeth configured to mate with ratcheting fasteners.

In some embodiments, the adjustable segment 314 includes at least one washer 338 between the nut 334 and tube 318 on the shaft 328. The washer 338 may have an outer diameter that is greater than an inner diameter of tube 318 so that the washer 338 prevents tube 318 from sliding over the nut 334. The adjustable segment 314 may also include at least one other washer 336 between the nut 334 and the one or more end fittings on the shaft 328. The washer 336 may have an outer diameter that is greater than an inner diameter of the base 316 so that the washer 336 prevents the base 316 from sliding over the nut 334.

The adjustable segment 314 may include another tube 340 configured to slide over at least a portion of tube 318. For example, in embodiments, tube 318 is a round tube and tube 340 is a rectangular tube that fits over tube 318 for improved strength and/or stability. In other embodiments, tube 318 and tube 340 are both rectangular tubes, both round tubes, or of any other tube geometry or combination of tube geometries. Alternatively, tubes 318 and 340 may be implemented by a single tube or by coaxial tubes that are welded, soldered, or cast together so that they form a common structure.

As shown in FIGS. 12 and 13, another (outermost) tube 320 is configured to slide over and cover at least a portion of tube 318 (and tube 340 if present) and at least a portion of the base 316. Tube 320 may be configured to cover portions of the shaft 328 that are not covered by tube 318 and/or tube 340. Tube 320 may also help stabilize the adjustable segment 314. For example, the outer edges of tube 320 may be configured to fill gaps between the base 316 and the inner walls of the vertical segment 306. In embodiments, the base 316 has a smaller width than the distance between the inner walls of the vertical segment 306 to create gaps for receiving the outer edges of tube 320. When tube 320 slides into the gaps between the base 316 and the inner walls of the vertical segment 306, tube 320 is able to provide improved stability for the base 316 and portions of the adjustable segment 314 that extend from the base 316 by tightly holding these components together, particularly as the weight of the bay window 100 pushes down on the adjustable window support device 300.

In some embodiments, the distal end 315 of tube 318 and/or tube 340 may be slanted in a first direction so that the distal end 315 of tube 318 and/or tube 340 is configured to be held in a selected position by the pin 348 at or near the front end 301 of the horizontal segment 302. Meanwhile, the distal end of tube 320 may be slanted in a second (opposite) direction so that the distal end of tube 320 can mate with the gaps between the base 316 and the inner walls of the vertical segment 306 when tube 320 is slid over the base 316 and pushed all the way down shaft 328.

Although the technology has been described with reference to the embodiments illustrated in the attached drawing figures, equivalents may be employed and substitutions made herein without departing from the scope of the technology as recited in the claims. Components illustrated and described herein are merely examples of a device and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. An adjustable window support device, comprising:
a horizontal segment configured to be placed against a lower surface of a bay window, the horizontal segment including a plurality of holes at or near a front end of the horizontal segment, the plurality of holes configured to receive a pin that extends through at least two holes of the plurality of holes, wherein the pin extends laterally across the horizontal segment;
a vertical segment configured to be placed against a wall and configured to extend downwardly from the lower surface of the bay window along the wall; the vertical segment including a top end that is pivotally coupled to a rear end of the horizontal segment; and
an adjustable segment configured to extend diagonally from a bottom end of the vertical segment to the pin at or near the front end of the horizontal segment, the adjustable segment including a first end that is pivotally coupled to the bottom end of the vertical segment and a second end that is configured to be held in a selected position by the pin at or near the front end of the horizontal segment.

2. The adjustable window support device of claim 1, wherein the pin is repositionable from one set of the plurality of holes to at least one other set of the plurality of holes.

3. The adjustable window support device of claim 2, further comprising a removable end cap at the front end of the horizontal segment, wherein the end cap is configured to be removed and replaced at the front end of the horizontal segment after removing a portion of the horizontal segment that includes two or more holes of the plurality of holes in order to reduce a length of the horizontal segment.

4. The adjustable window support device of claim 1, wherein the adjustable segment is configured to be adjusted by increasing or decreasing a length of the adjustable segment.

5. The adjustable window support device of claim 4, wherein the adjustable segment comprises:
a base;
a shaft configured to partially extend into a cavity within the base;
a nut configured to be positioned along the shaft by turning the nut clockwise or counterclockwise; and
a first tube disposed upon the shaft at a distance from the base, wherein the distance is based upon a position of the nut.

6. The adjustable window support device of claim 5, further comprising a washer between the nut and the first tube, wherein an outer diameter of the washer is greater than an inner diameter of the first tube.

7. The adjustable window support device of claim 5, further comprising a second tube disposed upon the shaft, wherein the second tube is configured to slide over and cover at least a portion of the first tube and at least a portion of the base.

8. The adjustable window support device of claim 7, further comprising a third tube disposed upon the shaft, wherein the third tube is configured to slide over at least a portion of the first tube and is configured to slide under at least a portion of the second tube.

9. An adjustable support device, comprising:
a horizontal segment configured to be placed against a lower surface of a protruding building structure, the horizontal segment including a plurality of holes at or near a front end of the horizontal segment, the plurality of holes configured to receive a pin that extends through at least two holes of the plurality of holes, wherein the pin extends laterally across the horizontal segment;
a vertical segment configured to be placed against a wall and configured to extend downwardly from the lower surface of the protruding building structure along the wall; the vertical segment including a top end that is pivotally coupled to a rear end of the horizontal segment; and
an adjustable segment configured to extend diagonally from a bottom end of the vertical segment to the pin at or near the front end of the horizontal segment, the adjustable segment including a first end that is pivotally coupled to the bottom end of the vertical segment and a second end that is configured to be held in a selected position by the pin at or near the front end of the horizontal segment.

10. The adjustable window support device of claim 1, wherein the pin is repositionable from one set of the plurality of holes to at least one other set of the plurality of holes.

11. The adjustable support device of claim 10, further comprising a removable end cap at the front end of the horizontal segment, wherein the end cap is configured to be removed and replaced at the front end of the horizontal segment after removing a portion of the horizontal segment that includes two or more holes of the plurality of holes in order to reduce a length of the horizontal segment.

12. The adjustable support device of claim 9, wherein the adjustable segment is configured to be adjusted by increasing or decreasing a length of the adjustable segment.

13. The adjustable support device of claim 12, wherein the adjustable segment comprises:
a base;
a shaft configured to partially extend into a cavity within the base;
a fastener configured to be positioned along the shaft; and
a first tube disposed upon the shaft at a distance from the base, wherein the distance is based upon a position of the fastener.

14. The adjustable support device of claim 13, further comprising a washer between the fastener and the first tube, wherein an outer diameter of the washer is greater than an inner diameter of the first tube.

15. The adjustable support device of claim 13, further comprising a second tube disposed upon the shaft, wherein the second tube is configured to slide over and cover at least a portion of the first tube and at least a portion of the base.

16. The adjustable support device of claim 15, further comprising a third tube disposed upon the shaft, wherein the third tube is configured to slide over at least a portion of the first tube and is configured to slide under at least a portion of the second tube.

17. A system, comprising:
a bay window; and
at least two adjustable window support devices placed against a wall beneath the bay window and spaced apart from one another, each of the at least two adjustable window support devices including:
a horizontal segment configured to be placed against a lower surface of the bay window, the horizontal segment including a plurality of holes at or near a front end of the horizontal segment, the plurality of holes configured to receive a pin that extends through at least two holes of the plurality of holes, wherein the pin extends laterally across the horizontal segment;

a vertical segment configured to be placed against the wall and configured to extend downwardly from the lower surface of the bay window along the wall; the vertical segment including a top end that is pivotally coupled to a rear end of the horizontal segment; and an adjustable segment configured to extend diagonally from a bottom end of the vertical segment to the pin at or near the front end of the horizontal segment, the adjustable segment including a first end that is pivotally coupled to the bottom end of the vertical segment and a second end that is configured to be held in a selected position by the pin at or near the front end of the horizontal segment, wherein the adjustable segment is configured to be adjusted by increasing or decreasing a length of the adjustable segment.

18. The system of claim 17, wherein the adjustable segment comprises:

a base;

a shaft configured to partially extend into a cavity within the base;

a nut configured to be positioned along the shaft by turning the nut clockwise or counterclockwise; and a first tube disposed upon the shaft at a distance from the base, wherein the distance is based upon a position of the nut.

19. The system of claim 18, further comprising a second tube disposed upon the shaft, wherein the second tube is configured to slide over and cover at least a portion of the first tube and at least a portion of the base.

20. The system of claim 19, further comprising a third tube disposed upon the shaft, wherein the third tube is configured to slide over at least a portion of the first tube and is configured to slide under at least a portion of the second tube.

* * * * *